United States Patent Office 3,445,992
Patented May 27, 1969

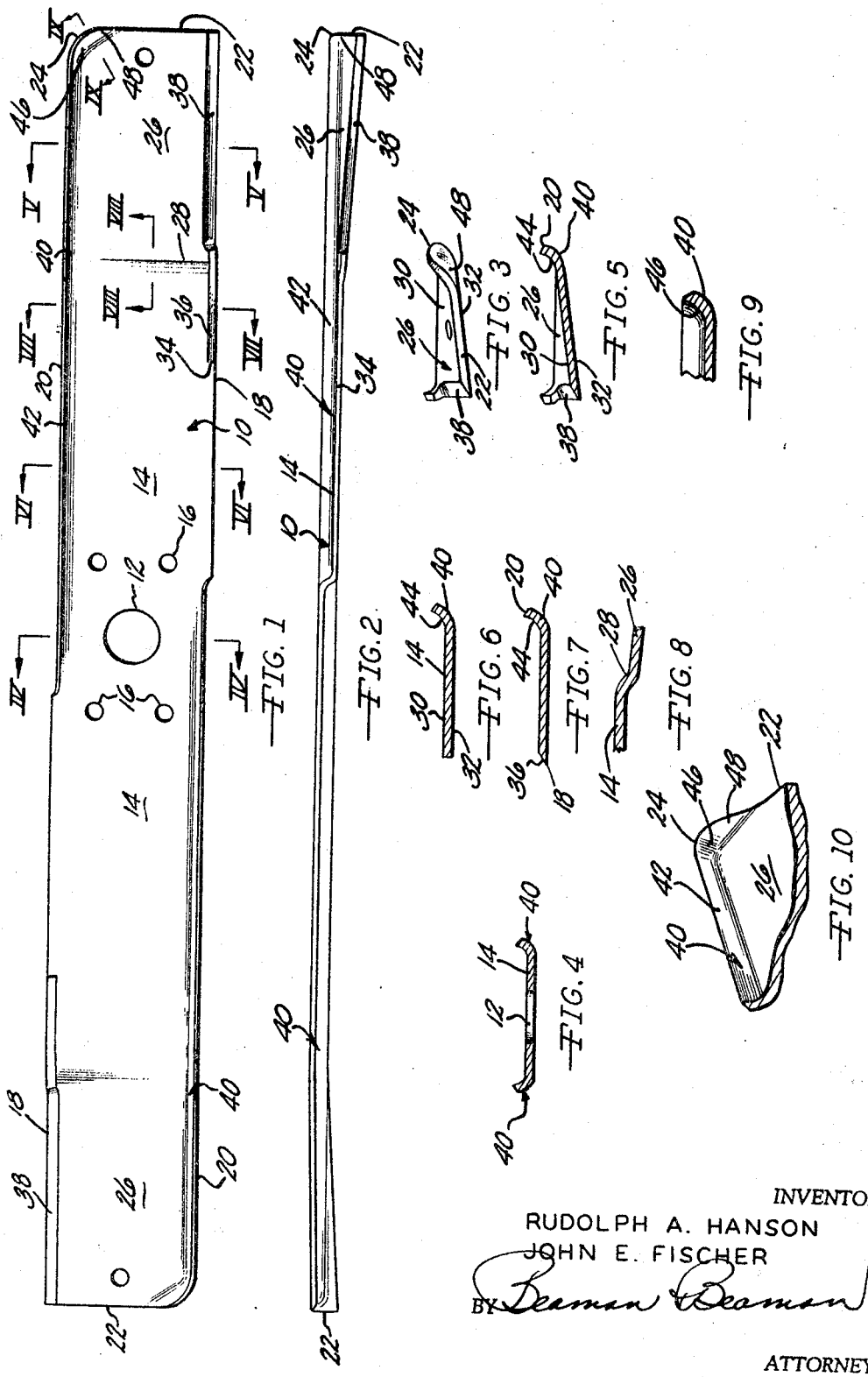

3,445,992
ROTARY MOWER BLADE
Rudolph A. Hanson and John E. Fischer, Jackson, Mich., assignors to Yard-Man, Inc., Jackson, Mich., a corporation of Michigan
Filed Apr. 20, 1966, Ser. No. 543,880
Int. Cl. A01d 55/18
U.S. Cl. 56—295      4 Claims

ABSTRACT OF THE DISCLOSURE

A blade for a rotoary mower wherein improved cutting, cleaning and air flow characteristics are obtained. The improvements are derived from a combination including a vane of a length substantially half of the blade body wherein the entire blade is effective for producing air flow, the vane extends in an arcuate manner about the intersection of the blade rear edge with the outer edge wherein grass clippings are restrained against being thrown outwardly against the mower housing in a radial direction. Additionally, the outer portion of the blade is deflected downwardly to reduce "drag" of the cut grass upon the blade.

---

In cutting blades for rotary lawn mowers wherein the blade is mounted on a vertically disposed drive shaft, often the crankshaft of a small internal combustion engine, the cutting blade rotates in a generally horizontal plane and is moved into contact with the grass to be cut as the mower mounting the engine and blade is moved along the ground. The leading edge of the cutting blade, with respect to the direction of rotation thereof, is normally provided with a sharp edge adjacent the blade ends and the cutting action primarily occurs at this sharp edge adjacent the blade ends. It has long been recognized that the efficiency of a rotor mower blade and the effectiveness of the cutting action can be improved by forming air deflecting vanes on the blade. Thus, as the blade rotates, the vanes formed on the blade cause the blade to act as a propeller or fan to draw air under the mower into the blade compartment. The low air pressure conditions produced below the blade cause air to rapidly flow up into the blade housing and "lift" the grass to improve the cutting thereof. Thus, grass, tall weeds, and the like, which may tend to be horizontally disposed are lifted into the path of the blade cutting edge by the air entering the blade housing. The air drawn into the blade housing by the vanes on the blade produces a superatmospheric pressure above the blade and aids in forceably ejecting the grass cuttings from the blade housing.

While the "fan" function of the blade is highly desirable for reasons set forth above, considerable power is required to produce an airflow and, thus, a rotary lawn mower producing a high velocity airflow must employ a considerably larger engine than a mower wherein little or no blade airflow is produced.

Another disadvantage arising from the use of vanes on a rotary mower blade to produce an airflow results from the fouling of the inner surfaces of the blade housing due to the movement of the grass cutting therein. The vanes and surfaces on a rotary mower blade which produce an upward airflow also tend to very rapidly deflect the grass cuttings in an upward direction. Also, the centrifugal forces imposed on the grass cuttings throws them radially outwardly, as well as upwardly. The rapidly moving grass cuttings traveling upwardly and radially outwardly adhere to the upper and side walls of the mower blade housing and begin to accumulate thereon. Such accumulation is particularly rapid when the grass is wet or has a high moisture content. The accumulation of grass cuttings on the inner surface of the blade housing very adversely affects the efficiency of the airflow within the blade housing. Blade housings are often formed with spiral-shaped air channels in the housing upper surface which are for the purpose of directing the airflow within the blade housing toward the mower discharge opening. An accumulation of grass cuttings on the underside of the mower blade housing within these spiral air channels produces excessive air frictional forces which negate much of the advantages of the air channels. Also, the accumulation of grass cuttings on the underside of the blade housing interferes with the discharge of cuttings from the blade housing and accumulation can become so great that interference with the blade is caused, and the mower will actually clog and stall.

It is an object of the invention to provide a cutting blade for a rotary lawn mower wherein a very efficient cutting action is produced and an airflow is provided by the blade. However, the configuration of the blade is such that unique airflow characteristics are produced which tend to produce a self-cleaning action with respect to any tendency for accumulation of grass cuttings within the blade housing.

Another object of the invention is to provide a cutting blade for a rotary lawn mower wherein an improved vane is defined on the cutting blade for producing a sufficient airflow for "lifting" horizontally disposed grass and for producing efficient discharging of the grass cuttings from the blade housing. Yet, the blade vane does not ncessitate excessive power requirements and the vane also contributes to the strength and rigidity of the blade.

An additional object of the invention is to provide a rotary lawn mower blade which produces an airflow within the mower housing of such a nature that the grass cuttings tend to clean the blade housing, rather than cause the grass cuttings to strike the blade housing in such manner that the grass cuttings would adhere thereto.

These and other objects of the invention arising from the details of construction of an embodiment utilizing the inventive concepts will be apparent from the following description and accompanying drawings wherein:

FIG. 1 is a top plan view of a rotary lawn mower blade constructed in accord with the invention.

FIG. 2 is an elevational view of a blade in accord with the invention,

FIG. 3 is an end view of the blade as taken from the right end of FIG. 2,

FIG. 4 is a sectional, elevational view taken along section IV—IV of FIG. 1,

FIG. 5 is an elevational, sectional view taken along section V—V of FIG. 1,

FIG. 6 is an elevational, sectional view taken along section VI—VI of FIG. 1,

FIG. 7 is an elevational, sectional view taken along section VII—VII of FIG. 1,

FIG. 8 is an elevational, sectional view taken along section VIII—VIII of FIG. 1, FIG. 9 is a detail, elevational, sectional view of the vane taken through the arcuate portion thereof along section IX—IX of FIG. 1, and FIG. 10 is a detail, perspective view of the vane adjacent the trailing and end edges.

In its preferred construction, a rotary lawn mower blade incorporating the priniciples of the invention is of the bar type and is of a generally linear, elongated configuration, wherein mounting means are provided at the center of the blade and a leading and trailing edge portion is defined on each of the lateral edges of the blade. Whether the lateral edge portions constitute a leading or trailing edge is determined by its relative relation to the direction of blade rotation. In that the concept of the invention can be practiced with a rotary mower blade which is not of the bar type, wherein the mounting of the blade occurs adjacent one end of the blade and since, in the embodiment of FIG. 1, both portions of the cutting blade from the axis of rotation to the ends of the blade are identical, only "one-half" of the blade will be described in detail.

The blade, in accord with the invention, includes a generally planar body member 10 which usually will be formed of plate steel, such as SAE 1060, and may be of 11 gauge material which is .1196 inch in thickness. The blade is to be mounted upon a vertically disposed drive shaft which extends through a hole 12 defined on the innermost portion 14 of the body member. In that some blade mountings require bolt holes 16, these holes are also provided. The body member 10, when describing the portion of the blade from section line IV—IV to the right end edge, as appearing in FIG. 1, includes a longitudinally extending leading edge 18 and a substantially parallel trailing edge 20. The outer end of the body member is defined by an end edge 22 which, preferably, is perpendicularly disposed to the longitudinal axis of the body member. The leading edge 18 intersects the end edge 22 at a right angle, and the intersection of the trailing edge 20 and end edge 22 is in the form of a radius 24.

The body member 10 is formed at its outer portion 26 such that a transverse bend occurs forming a line of demarcation at 28, FIGS. 1 and 8, between the outer body member portion 26 and the body inner mounting portion 14. The outer portion 26 is formed such that this portion, as defined by the upper and lower surfaces of the body member, 30 and 32, respectfully, is inclined in a downwardly direction from the trailing edge 20 toward the leading edge 18. This relationship will be apparent from FIGS. 2, 3 and 5, wherein comparison with the horizontal portion 14 can be made. The degree of inclination of the body member portion 26 from the line of demarcation 28 and the end edge 22 increases adjacent the edge 22 so that the blade upper surface 30 and lower surface 32 will be inclined at approximately 7½° to the horizontal at the intersection of these surfaces with edge 22.

In addition to being inclined downwardly in the forward direction, in the aforedescribed manner, the outer portion 26 is also inclined in the longitudinal direction, as will be apparent from FIG. 2. From the line of demarcation 28 to the end edge 22, the outer portion 26 is inclined downwardly in the radial direction on approximately a 4° angle with respect to the body portion 14. Thus, it will be apparent that the lowermost part of the blade, when mounted in a mower, is represented at the intersection of the leading edge 18 and the outer end edge 22. It is to be noted, however, that the trailing edge 20 associated with the portion 26 is not inclined downwardly from the line 28, but remains linear throughout its length. Therefore, both the longitudinal inclination of portion 26 and the transverse inclination thereof are primarily in the direction of the intersection of edges 18 and 22.

Therefore, it will be appreciated that the blade member outer portion 26 is inclined both in a forward, downward direction from the trailing edge 20 to the leading edge 18 and in a radial, outward, downward direction from the line of demarcation 28 to the edge 22. These inclinations place the lowermost blade portion adjacent the edge 22 and provide a clearance under the blade which minimizes drag on the blade from the cut grass passing thereunder, as well as tending to direct air upwardly as it passes over the upper surface 30 of the blade portion 26.

The body member leading edge 18 is shaved from point 34 to the edge 22, FIG. 7, prior to formation of the angles of inclination of the outer portion 26. This shaving can be accomplished in a press and forms a surface 36 obliquely related to the horizontal, intersecting the upper surface 30 and extending in a forward and downward direction, FIG. 7. The purpose of the shaving operation is to minimize the amount of material removed along the leading edge during the grinding operation which forms the cutting edge surface 38, FIG. 5. The cutting edge surface 38 is inclined in a downward direction from the upper surface 30 of the portion 26 to the lower surface 32 thereof and, thus, a sharpened edge will be defined at the intersection with the bottom surface 32. The inclination of the surface 38 is such as to cause air and grass clippings to be deflected in both an upper and slightly radial outward direction.

The blade, in accord with the invention, is provided with a vane for producing and controlling airflow within the mower housing. The vane is formed from the material of the blade body member and is disposed along the trailing edge and a portion of the end edge. As is apparent from FIGS. 1, 2, 5 and 10, the vane 40 includes a linear portion 42 immediately adjacent the body member trailing edge 20 and extending the length thereof, wherein the trailing edge actually defines the upper end of the vane. The vane 40 extends longitudinally from the radius 24 past the hole 12, as is apparent from FIG. 1. Thus, the vanes 40 significantly contribute to the strength and stiffening of the blade body member. The vane 40 is bent upwardly in such a manner that the upper surface is formed in a gentle concave curve 44, FIG. 5.

The vane 40 passes around the intersection of the trailing edge 20 and the outer end edge 22, i.e., the radius 24, and extends along the edge 22 a limited degree, preferably less than one-half the distance separating the trailing and leading edges 20 and 18. As will be noted from FIGS. 1, 9 and 10, as the vane 40 passes around the radius 24, a smooth, continuous and concave surface 46 is formed, as apparent in the plan view of FIG. 1 and the perspective view of FIG. 10. A portion of the blade member outer portion 26 is deformed upwardly along the end edge 22 to form the vane portion 48 therealong. The vane portion 48 gently merges into the configuration of the portion 26 adjacent the edge 22, FIGS. 3 and 10, as it extends toward the leading edge 18. Thus, it will be appreciated that the vane 40 extends in a continuous manner along the trailing edge 20, around the intersection of the trailing edge and the outer edge 22 and along the outer edge a limited degree toward the leading edge.

It has been found that a blade constructed in accord with the above described features provides a very effective cutting action, yet tends to keep the surfaces of the blade housing, or mower deck, immediately above the blade and radially outwardly from the blade, relatively clean and free from grass clippings and other foreign matter adhering thereto. The exact reason for the improved performance is not fully understood. However, it is believed that the downward inclination of the portion 26 from the trailing edge to the leading edge and the outward and downward inclination of the portion 26 from the demarcation line 28 to the outer edge 22, in conjunction with the unique configuration of the vane, tends to move the air and grass cuttings in such a manner as to "scrub" and clean the underside of the blade housing as the blade rotates.

By continuing the vane 40 around the radius 24 and along the end edge 22, the presence of the arcuate, concave surface 46 appears to produce an airflow which discourages grass clipping buildup on the side walls of the mower housing which would be due to radial movement of the grass clippings with respect to the axis of rotation of the blade.

The improved stiffening to the blade provided by the length of the vanes 40 minimizes vibration within the blade, and as the vane is of a uniform configuration throughout its entire length along the trailing edge 20 and is of a uniform vertical dimension throughout this length, the flow of air produced by the vane is so directed and distributed that buildup above the blade is minimized and an actual "self-cleaning" action is produced.

It is understood that various modifications to the invention may be apparent to those skilled in the art without departing from the spirit and scope thereof, and it is intended that the invention be defined only by the scope of the following claims.

We claim:

1. A cutting blade for rotary lawn mowers adapted to rotate in a horizontal plane comprising an elongated body member having an inner mouting portion, an upper surface, a lower surface, and an outer end edge transversely disposed to the length of said body member, a leading edge and a trailing edge defined on said body member intersecting said outer end edge, a sharp cutting portion defined on said leading edge adjacent said end edge, a deflecting vane defined on said body member, said vane being formed of the material of said body member and extending upwardly with respect to said body member upper surface and having a length substantially half of the length of said body member, said vane being defined along said trailing edge and extending around the intersection of said trailing edge and said outer end edge and along said outer edge at least a portion of the distance along said outer edge from said trailing edge toward said leading edge, said vane being of an arcuate configuration at the intersection of said trailing and outer end edges defining an upwardly inclined, concave surface around said intersection.

2. A cutting blade for rotary lawn mowers adapted to rotate in a horizontal plane comprising an elongated body member having an inner mounting portion, an upper surface, a lower surface, and an outer end edge transversely disposed to the length of said body member, a leading edge and a trailing edge defined on said body member intersecting said outer end edge, a sharp cutting portion defined on said leading edge adjacent said end edge, said body member being of a relatively flat configuration, the portion of said body member adjacent to said inner mounting portion being substantially parallel to the plane of rotation of the blade, said body member including an outer portion longitudinally defined by the portion adjacent said inner mounting portion and said outer end edge and laterally defined by said trailing and leading edges, said body member outer portion being inclined in a downward direction from said trailing edge to said leading edge, said leading edge of said outer portion being inclined downwardly from said portion adjacent said inner mounting portion to said outer end edge whereby the lowermost portion of said blade is defined on said leading edge at the intersection thereof with said outer end edge, a deflecting vane defined on said body member, said vane being formed of the material of said body member and extending upwardly with respect to said body member upper surface, said vane being defined along said trailing edge and extending around the intersection of said trailing edge and said outer end and along said outer edge at least a portion of the distance along said outer edge from said trailing edge toward said leading edge.

3. In a cutting blade as in claim 2, wherein said vane is of an arcuate configuration at the intersection of said trailing and outer end edges defining an upwardly inclined, concave surface adjacent said intersection.

4. In a cutting blade as in claim 2, wherein said vane is of a substantially uniform, vertical dimension along said trailing edge and linearly extends from said outer edge to said inner mounting portion, said vane being obliquely related to said upper surface along said outer edge whereby said vane gradually merges into said upper surface along said outer edge.

References Cited

UNITED STATES PATENTS

| | | | |
|---|---|---|---|
| 2,854,807 | 10/1958 | Byler et al. | 56—295 |
| 2,983,096 | 5/1961 | Phelps | 56—295 |
| 3,008,284 | 11/1961 | Bright | 56—25.4 |
| 3,080,697 | 3/1963 | Mauro | 56—295 |

ROBERT E. BAGWILL, *Primary Examiner.*